March 23, 1943.  O. TUBBS  2,314,467
DIPPING EQUIPMENT
Filed March 19, 1941  2 Sheets-Sheet 1

Inventor
Orville Tubbs
By Freeman, Sweet and Albrecht
Attys.

March 23, 1943.　　　　O. TUBBS　　　　2,314,467
DIPPING EQUIPMENT
Filed March 19, 1941　　　2 Sheets-Sheet 2
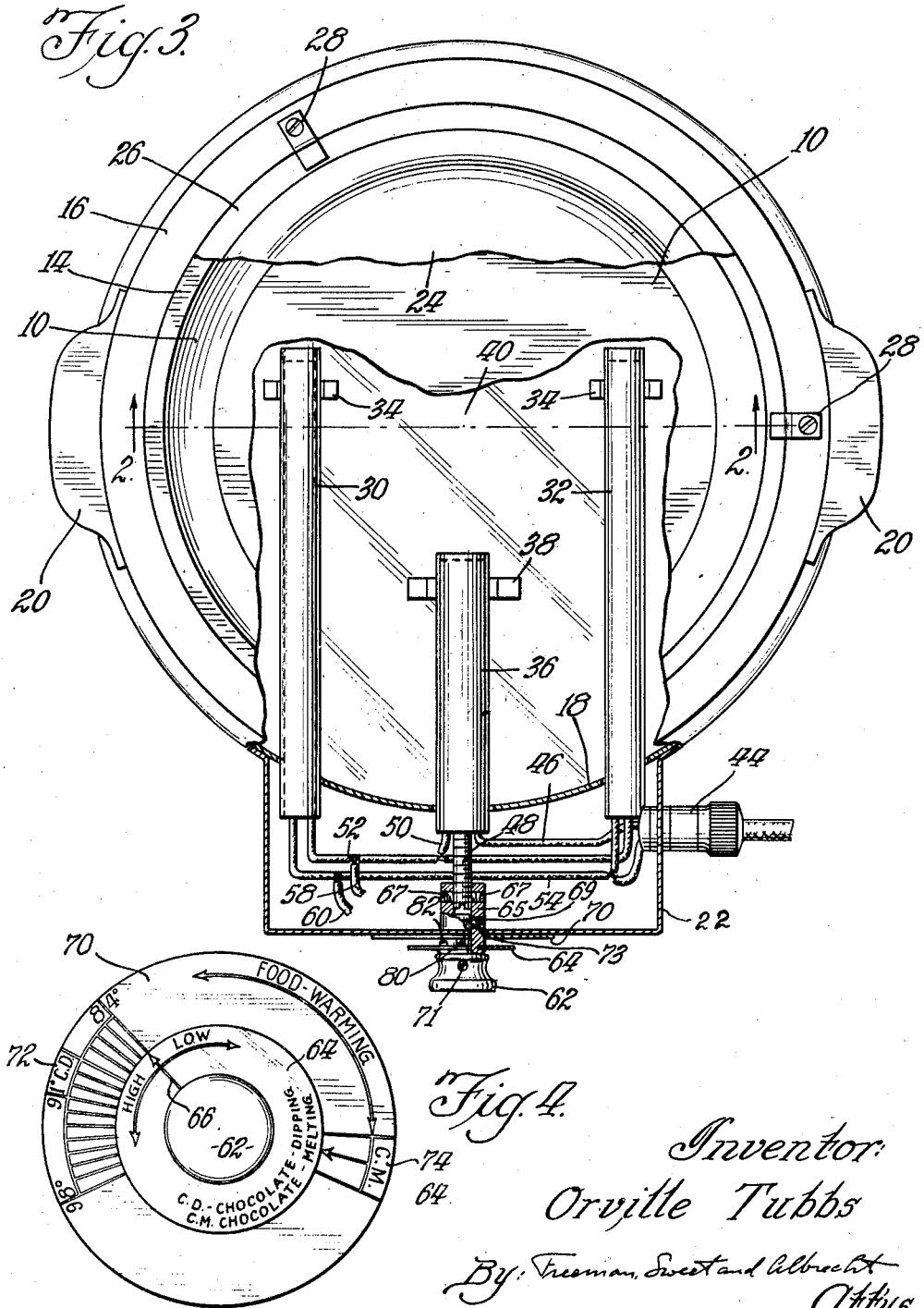

Patented Mar. 23, 1943

2,314,467

UNITED STATES PATENT OFFICE 2,314,467

DIPPING EQUIPMENT

Orville Tubbs, Chicago, Ill.

Application March 19, 1941, Serial No. 384,099

3 Claims. (Cl. 219—44)

My invention relates to candy manufacture and includes among its objects and advantages the provision of a precisely controllable chocolate dipping bath by means of which the hand application of chocolate coatings can be speeded up.

In the accompanying drawings:

Figure 3 is a plan view with some of the parts broken away; and

Figure 4 is a full size view of the adjustment dials.

Figure 1:
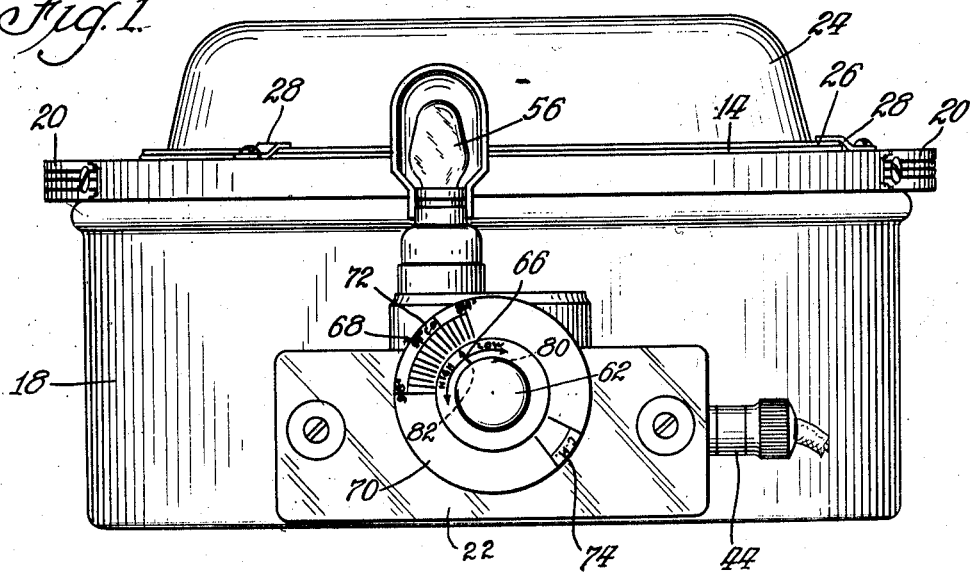
Figure 1 is a front elevation of a device according to the invention.

In the embodiment of the invention selected for illustration, the basin 10 receives and holds a supply of chocolate which, when first melted, may have its upper surface approximately at the level indicated by the dotted line 12. This level will usually be lowered to the bottom during each use of the device. The basin 10 has a peripheral flange 14 which rests on the upper annulus 16 of the water bath 18, which is provided with handles 20 diametrically opposite each other and equally spaced from the control housing 22. When it is desired to leave the device for an extended period of time with melted chocolate in it, the cover 24 may be put in place with its flange 26 overlying the flange 14. This protects the chocolate from exposure to the air and avoids the accumulation of a skin or scum on the surface of the mass of melted chocolate. I have indicated three uniformly spaced pivoted clips 28 mounted on the annulus 16 and adapted to overlie the flange 14 or the flanges 14 and 26, as the case may be, to avoid accidental or unintentional displacement of these parts, and to hold down the basin 10 when the contents become so light that it would otherwise float up.

The bath 18 is a simple cylindrical container and is preferably filled with enough water so that when the basin 10 is in place, the water level will be substantially as high as the level of the melted chocolate in the basin. Extending inward into the water bath from the housing 22 are two duplicate heaters 30 and 32 having their inner ends resting in supporting brackets. These heaters may be of previously known types, but should be designed to have minimum heat storing capacity in the structure of the heater itself. A similar mounting 38 supports a thermostatic control switch 36. Any suitable type of switch may be employed. United States Patent 2,090,407 illustrates and describes one type of switch suitable for such uses. All three brackets 34 and 38 are mounted on the bottom 40 of the water bath, which bottom is slightly above the level of the peripheral edge 42 of the cylindrical wall of the chamber so that when the device is set on a table or similar support, the bottom 40 will be spaced from the support and loss of heat by conduction to the support will be minimized.

The connector 44 is adapted to receive current for energizing the heating means. From the connector 44 the wire 46 extends to the thermostat, which is designated as a whole by the reference character 36. From the thermostat 36, the wire 50 extends to the cross connection 52 leading to one terminal of each of the heaters 30 and 32, and from the other terminals of the heaters the return wire 54 extends back to the plug 44. Thus the heaters are connected in parallel.

I have provided a pilot light 56 connected in parallel with both heaters as by means of wire 58 leading from wire 52 and wire 60 leading back to wire 54, so that the operator will be aware of the functioning of the device by observing the lighting of the light 56 whenever the heaters are in operation.

The adjusting screw 48 for the thermostat 36 terminates in the operating knob 62, which knob is provided with a flange 64 carrying suitable indicia to assist the operator. I have illustrated an arrow 66 pointing to calibrations on the stationary plate 70. The calibrations 68 in the upper left hand quadrant of the plate 70 may be made to indicate the actual working temperatures of the water in the bath, and the three degree range from 88° F. to 91° F. produces the chocolate temperature commonly employed for dipping for best results, is indicated peripherally by the indicia C. D. at 72 and explained by the legend on the flange 64 "C. D. Cholocate dipping."

Similarly, the higher temperature adjustment desirable for the initial melting of the chocolate is indicated in the lower right hand quadrant of the plate by the indicia C. M. at 74, and explained by the legend on the flange 64 "C. M. Chocolate melting."

Figure 2:
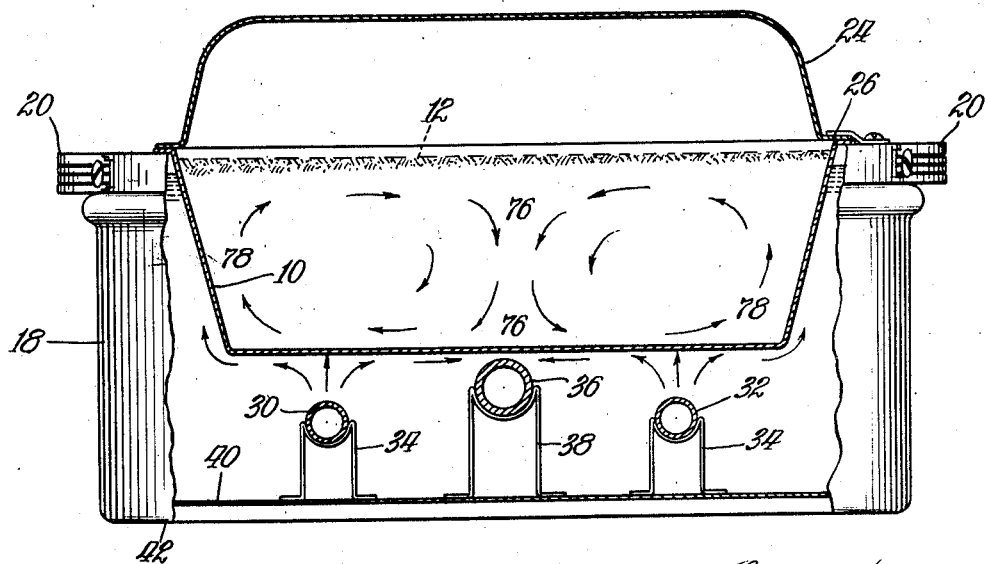
Figure 2 is a rear view partly in section as on line 2—2 of Figure 3.

Referring now more particularly to Figure 2, it will be noted that heat is imparted to the chocolate in the basin 10 over the entire bottom and side walls of the mass of chocolate, whereas the cooling effect during operation, which results from the dipping of the candy centers and the fingers of the operator into the bath remote from the edge thereof, will cause a local cooling and generate a slow downward movement of slightly cooler liquid approximately as indicated by the arrows 76. And this action, combined with the heating action of the water bath, will generate a slow torus movement radially outward along the bottom of the mass and upward along the outer edges of the mass as indicated approximately by the arrows 78.

It will be noted that the positioning of the thermostat 36 is such that it is directly below the path of movement of the cooler portions of the chocolate, so that the temperature drop during periods when the heaters are not operating, will impinge first on the thermostat itself. When the thermostat operates to close the circuit and the heaters 30 and 32 become operative, the hot water from these heaters will rise first directly upward and then spread laterally in both directions under the bottom of the basin 10. The outwardly directed portions of this stream of relatively warm water will curve up around the basin 10, and the inwardly directed portions will move toward each other and meet directly at the thermostat 36. Accordingly, it will be apparent that the temperature gradients introduced by cooling of the chocolate and by heating of the water, both impinge directly on the thermostat before they distribute themselves throughout the balance of the mass to any great extent. On this account, with a thermostat of obtainable sensitivity, it is possible to achieve a high degree of consistency and uniformity in the temperature of the chocolate throughout extended periods of operation.

It will be noted that the sensitivity of the thermostat is such that a single turn of the knob 62 will change the adjustment from 84° up to the optimum temperatures for melting chocolate and even higher temperatures suitable for food warming. A fixed stop 80 rigid with the plate 70 and a similar stop 82 carried by the adjusting knob 62 prevent displacement of the thermostat into a different range of adjustment.

The dial 64 is fixed on a mounting sleeve or coupling 65, which may be adjusted in manufacture by means of setscrews 67 engaging the shaft 48, so that the temperature is correctly indicated by the indicia. The knob 62 is fastened on the extension 69 by the setscrew 71, and the extension 69 is fastened in the coupling 65 by the setscrew 73. Thus if, for any reason, the user should remove the knob 62, by loosening either set screw 71 or 73, the adjustment for correct temperature indication will remain undisturbed.

In normal operation the user fills the basin 10 with piled up lumps of chocolate and adjusts the thermostat for chocolate melting. As soon as the chocolate is melted, the thermostat is turned back to the adjustment for chocolate dipping. And if the user happens to be in an unusual hurry the basin 10 can be lifted out and set in cold water for about two minutes and then replaced. As soon as the pilot light 56 lights up again after the thermostat has been adjusted back for chocolate dipping, the bath is ready for use. I have found that different individuals have different effective blood temperatures particularly in their hands such that a dipper with cold hands will want to use the 91° adjustment while working, whereas a dipper with warm hands will want to use the 87° adjustment.

The centers are dipped in the chocolate in the well known way and thus the level of the chocolate is continuously lowered by such dipping. This can continue until the depth of chocolate in the container is insufficient for dipping centers. At this time it is time to refill and melt another batch of chocolate, but as a rule the user keeps a supply of raisins or peanuts or other nuts available and swabs up all the chocolate in the basin making raisin clusters or nut clusters, before refilling.

Without further elaboration the foregoing will so fully explain my invention that others may, by applying knowledge current at the time of application, readily adapt the same for use under various conditions of service.

I claim:

1. Equipment for melting chocolate and maintaining it at a constant temperature for dipping purposes comprising in combination: a chocolate container having a thin walled flat bottom of high heat conductivity and low thermal capacity; a water bath immersing the bottom and sides of said container; said water bath having heat capacity not less than the heat capacity of said chocolate container and its contents; electrical heating means immersed in said water bath and spaced a predetermined distance below the bottom of said container; said electrical heating means being of insufficient power to cause local generation of steam during the normal operation of the device; a temperature responsive element spaced below the bottom of said container and immersed in said water bath; said thermostat being at a higher level than said heating means and laterally offset from said heating means; whereby a material but minor fraction of the water in said bath must be heated by said heating means and spread out along the bottom of said container before said temperature-responsive device is affected; circuit control means operatively connected to said temperature responsive device for automatic operation thereby, to connect said electrical heating means at a predetermined lower temperature of said temperature-responsive device and to disconnect said electrical heating means at a predetermined higher temperature of said temperature responsive device; the interval between said temperatures not exceeding 6° F.; and manual adjustment means for changing both said temperatures simultaneously in the same direction to vary the average temperature at which the material of said container is automatically kept, while maintaining the temperature range of the material in said container constant within a small range of variation above or below said average temperature.

2. Equipment for melting chocolate and maintaining it at a constant temperature for dipping purposes comprising in combination: a chocolate container having a thin walled flat bottom of high heat conductivity and low thermal capacity; a water bath immersing the bottom and sides of said container; said water bath having heat capacity not less than the heat capacity of said chocolate container and its contents; electrical heating means immersed in said water bath and spaced a predetermined distance below the bottom of said container; a temperature responsive element spaced below the bottom of said container and immersed in said water bath; said thermostat being at a higher level than said heating means and laterally offset from said heating means; whereby a material but minor fraction of the water in said bath must be heated by said heating means and spread out along the bottom of said container before said temperature-responsive device is affected; circuit control means operatively connected to said temperature responsive device for automatic operation thereby, to connect said electrical heating means at a predetermined lower temperature of said temperature-responsive device and to disconnect said electrical heating means at a predetermined higher temperature of said temperature responsive device; the interval between said temperatures not exceeding 6° F.; and manual adjustment means for changing both said temperatures simultaneously in the same direction to vary the average temperature at which the material of said container is automatically kept, while maintaining the temperature range of the material in said container constant within a small range of variation above or below said average temperature.

3. Equipment for melting chocolate and maintaining it at a constant temperature for dipping purposes comprising in combination: a chocolate container having a thin bottom wall of high heat conductivity and low thermal capacity; a water bath immersing the bottom and sides of said container; electrical heating means immersed in said water bath and spaced a predetermined distance below the bottom of said container; a temperature responsive element spaced below the bottom of said container and immersed in said water bath; said thermostat being at a higher level than said heating means and laterally offset from said heating means; whereby a material but minor fraction of the water in said bath must be heated by said heating means and spread out along the bottom of said container before said temperature-responsive device is affected; circuit control means operatively connected to said temperature responsive device for automatic operation thereby, to connect said electrical heating means at a predetermined lower temperature of said temperature-responsive device and to disconnect said electrical heating means at a predetermined higher temperature of said temperature responsive device; the interval between said temperatures not exceeding 4° F.; and manual adjustment means for changing both said temperatures simultaneously in the same direction to vary the average temperature at which the material of said container is automatically kept while maintaining the temperature range of the material in said container constant within a small range of variation above or below said average temperature.

ORVILLE TUBBS.